Aug. 25, 1931.  A. W. BROWN  1,820,647
METHOD OF AND MEANS FOR INDICATING DIRECTION
Filed Aug. 14, 1930
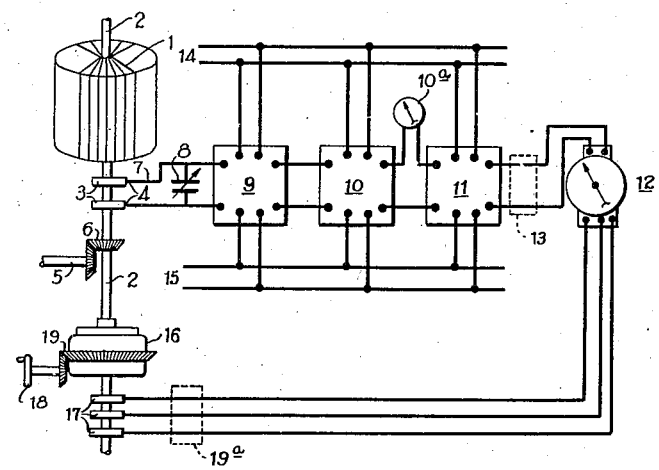
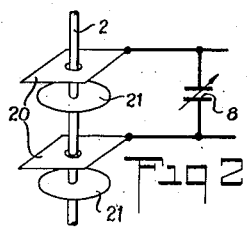
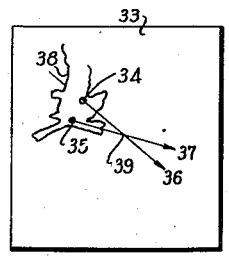
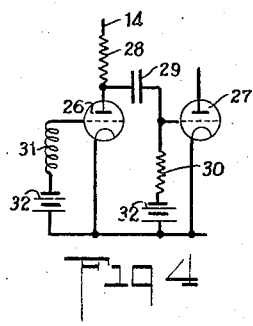
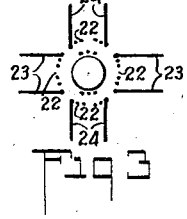
INVENTOR
Arthur Whitten Brown
BY
P. B. Smith
ATTORNEY Patented Aug. 25, 1931

1,820,647

UNITED STATES PATENT OFFICE

ARTHUR WHITTEN BROWN, OF LANGLAND, SWANSEA, WALES

METHOD OF AND MEANS FOR INDICATING DIRECTION

Application filed August 14, 1930, Serial No 475,339, and in Great Britain August 13, 1929.

This invention relates to wireless or radio direction finding systems and has for its main object to provide a system in which an instrument provides a continuous and positive indication or a record of the bearing or direction of a high frequency wave front irrespective of any movement of the axis of reference.

According to the invention a receiving aerial or search coil of the directional type is rotated at a fixed speed of say 25 revolutions per second and the high frequency currents received by said rotating aerial or search coil are rectified, with amplification if necessary, and the phase difference between the rectified current and a reference current of the same frequency is measured by an instrument such as a synchroscope, powerfactor meter, oscillograph, oscillocope, or the like which thus provides a positive indication of the bearing of the wave front. Such instrument may have such a scale or chart and/or be so calibrated that its point or the equivalent gives a compass bearing indication of the position of the transmitting station or even points directly towards the latter and the indication will be properly given irrespective of the position or direction of travel of the ship or aircraft which carries the direction finding system. Obviously the instrument may alternatively or in addition provide a permanent record of the bearings of wave fronts.

In carrying out the invention the rotating portion may be of the tuned or tunable frame aerial type and the currents may be collected therefrom by slip rings or by a condenser, being received directly, or by a fixed aerial and field coil system such as of the type used in Bellini-Tosi radiogoniometers. The aerial may be constructed so that the strength of the current which is received compared with the direction of the transmitting station approximates in form to a sine-curve.

The rotating portion may be mounted on a vertical shaft which is rotated by electric, hand or wind power or in any other convenient way, and the rotor, such as the field magnets, of an alternating current generator may be secured to or connected by gearing with said shaft so as to rotate proportionally therewith, whilst the stator of the generator is fixed but preferably adjustable in the direction of rotation. The generator need only be a small machine capable of delivery say 20 watts at 50 cycles, and the field magnets may thus be of the permanent type.

If a supply of alternating current is available, this by suitable transforming, may be used as the reference current, and the aerial may be rotated by a synchronous motor driven from the supply.

The received high frequency currents may be amplified at high frequency and then rectified so as to obtain a low frequency alternating current of say 50 cycles which may be amplified and corrected as to wave form so as to obtain a current substantially equal in amplitude to the reference current, for properly operating the instrument.

The invention also comprises an arrangement of two or more systems as above set forth for obtaining positions by cross bearings. Thus the receiving systems may be spaced apart and arranged to receive the same or different transmission simultaneously whilst the indicating instruments are adjacent one to another, being arranged for instance on a map or chart, the position being found from the intersection of the pointers, or alternatively the several receivers may be close together and tuned to receive different transmissions simultaneously.

Polyphase aerials, generators and instruments may in some cases be used with advantage.

To enable the invention to be clearly understood it will now be described, by way of example, with reference to the accompanying drawings, in which Figure 1 is a diagrammatic representation of direction finding system in accordance with the invention.

Figure 2 is a perspective view of a modified arrangement for collecting the aerial currents.

Figure 3 is a sectional plan view of a further arrangement for collecting the aerial currents.

Figure 4 is a diagram illustrating a method of correcting the received currents as to wave form, and Figure 5 a diagram illustrating a method of obtaining positions or directions by cross bearings.

Referring first to Figure 1 of the drawings, 1 represents a frame aerial fixed upon a vertical shaft 2, and having its ends brought out to slip rings 3, engaged by collector brushes 4. The shaft 2 is rotated by any convenient means connected, for instance, to a shaft 5 which drives the shaft 2 through gearing 6. The shaft 5 may be itself rotated by means of an electric motor, an air screw or from any existing rotating device such as the engine shaft of a ship or by a synchronous motor for example.

The collector brushes 4 are connected by leads 7 with a tuning means such as the illustrated variable condenser 8 for the frame aerial 2. The leads 7 are also connected to the high frequency amplifier 9, the output of which is connected to a rectifier 10, and the output of the latter is connected to a low frequency amplifier 11, the output of which is, in turn, connected to one element of an instrument 12 capable of indicating phase difference. Said instrument may comprise a synchroscope, power-factor meter, or oscillograph, oscilloscope or the like. The instrument 12 may be connected to the amplifier 11 if desired through a transformer indicated by the dotted rectangle 13. Reference numerals 14 and 15 represent respectively the high tension and low tension busbars of the amplifiers and rectifier 9, 10 and 11. A galvanometer 10ª may be employed for checking the tuning adjustment.

In the arrangement shown in Figure 1, the shaft 2 carries the rotor of a small alternating current generator 16, having such a number of poles that the alternating current derived from the slip rings 17 of the generator has a frequency equal to that derived from the frame aerial 1. The stator of the generator 16 is preferably angularly adjustable in azimuth about the shaft 2, and for this purpose the hand-wheel 18 and gearing 19 may be provided, together with a suitable brake (not shown) if necessary. The current generated by the machine 16 is passed, if necessary through a transformer indicated by the dotted rectangle 19ª, to the other element of the instrument 12. In Figure 1 the machine 16 is indicated as a three-phase generator, although this is not essential. In fact the aerial 1 may have multi-windings and the amplifier and rectifier devices 9, 10 and 11 may provide multi-phase current for the instrument 12.

Instead of slip rings 3 condenser plates 20 and 21 may be employed for collecting the currents received by the aerial 1. Thus, as shown in Figure 2, the leads 7 may be connected to fixed plates 20 whilst the terminals of the frame aerial may be connected to rotating plates 21 fixed to the shaft 2.

Referring to Figure 3, the further arrangement therein illustrated comprises field coils 22 for connection to Bellini-Tosi loops or adcock aerials, having respective terminals 23 and 24, and a rotating search coil 25.

In Figures 1 and 3 the loops or field coils of the aerial are spaced out with the object of deriving currents which approximate in form to sine-wave.

In Figure 4 is illustrated by way of example means for correcting the rectified currents as to wave form, said means comprising the rectifier valve 26, coupled to a low frequency amplifying valve 27 by means of a resistance 28, condenser 29 and grid leak 30, the values of which elements are chosen so as to provide the requisite time constant in relation to frequency due to the speed of rotation of the aerial. 31 represents the usual input inductance for the rectifier 26, and the usual grid bias batteries 32 are also shown.

It will be apparent from the foregoing that as the loop aerial, which may be tuned to a continuous wave of any frequency, is rotated, the amplitude of the incoming wave is varied to produce an envelope wave which has two maxima and two minima for each revolution of the loop. The radio frequency currents whose amplitudes are thus varied are amplified by means of the radio frequency amplifier 9 and detected or rectified by the detector 10, thereby deriving a pulsating current, the frequency of which corresponds to the amplitude frequency of the envelope, and when passed through the audio frequency amplifier 11 the output derived is an alternating current having a frequency of twice the number of revolutions per second of the loop. Suitable speeds for the operation of the systems may be such as to give alternating currents of approximately 50 cycles, although any other suitable speeds of rotation may be employed. The wave form of the alternating current thus derived may be corrected to conform to a true sine wave by providing the arrangement between the detector 10 and the amplifier 11 as shown in Fig. 4 and hereinbefore explained. The alternating current is then passed to the indicator 12 where it is combined with the locally generated alternating current and their phase relation indicated, said phase relation depending upon the direction of the incoming radio frequency currents.

The position of the peaks of the alternating current waves with respect to any reference plane through the axis of rotation of the loop will depend upon the angle between such plane and the plane of a great circle cutting the loop center and the transmitter, while the position of the peaks of the locally generated alternating current waves with respect to the said reference plane will depend upon the position of the generator field in relation to said reference plane and may be made to coincide therewith. It will thus be apparent that the phase relation between the two waves will determine the direction of the incoming radio frequency wave and may be indicated in terms of direction on the indicator 12.

Referring, finally, to Figure 5, this illustrates the method of obtaining positions by cross bearings. For such purpose two rotating aerial systems such as hereinbefore described may be spaced apart and arranged to receive simultaneously the same transmission or different transmissions, the indicating instruments 12 being, however, adjacent to one another, and arranged, for instance on or beneath a map or chart 33, at 34 and 35 respectively, the pointers of such instruments being indicated in Figure 5 by arrows 36 and 37 respectively. The points 34 and 35 may represent on a map 38 the position of two receiving stations so that as will be readily appreciated the point 39 at the intersection of the pointers 36 and 37 will represent the position of the ship or aircraft which carries the C. W. transmitter to which the receivers are tuned.

In an alternative arrangement the two rotating aerials may be disposed comparatively close to one another or even upon the same shaft and may be turned to receive different transmissions simultaneously. The crossed pointers will then indicate the position of the receiving station and the position of the ship or aircraft may thus be obtained.

When the shaft 5 is driven by a synchronous motor from any suitable existing alternating current supply, the latter may be used as the reference wave instead of the current provided by the generator 16, and ratio of the gearing 6 being properly chosen.

As previously herein set forth the one or more phase indicating instruments may be arranged to provide a record. Such record may be taken continuously or periodically.

It will be understood that various minor modifications may be made without departing from the scope of this invention.

I claim:—

1. A method of indicating the direction of an incoming radio frequency current, which consists in varying the amplitude of said current to produce a wave having a predetermined frequency, correcting the form of said derived wave to conform to a true sine wave, generating a local alternating current having the same frequency as the produced wave, and indicating the phase relation between the produced wave and the locally generated current.

2. A method of indicating the direction of an incoming radio frequency current, which consists in varying the amplitude of said current to produce a sine wave having a predetermined frequency, generating a local alternating current having the same frequency as the sine wave, adjusting the phase of the local current with respect to a predetermined reference plane, combining said sine wave with the locally generated current, and indicating in terms of direction the phase relation between the sine wave and the local current.

3. A method of indicating the direction of an incoming radio frequency current, which consists in varying the amplitude of said current at a predetermined frequency to produce an envelope of lower frequency and having approximately the characteristics of a sine wave, rectifying said radio frequency current to derive the sine wave, correcting the form of said derived wave to conform to a true sine wave, generating a local alternating current having the same frequency as the sine wave, combining the sine wave with the locally generated current, and indicating the phase relation between said sine wave and said local current.

4. A method of indicating the direction of an incoming radio frequency current, which consists in varying the amplitude of said current at a predetermined frequency to produce an envelope of lower frequency and having approximately the characteristics of a sine wave, rectifying said radio frequency currents to derive the sine wave, correcting the form of the derived wave to conform to a true sine wave, generating simultaneously with the variation of the amplitude of the incoming current a local alternating current having the same frequency as the sine wave, adjusting the phase of the local current with respect to a predetermined reference plane, combining the true sine wave with the locally generated current, and indicating in terms of direction the phase relation between said sine wave and said local current.

5. A method of indicating the direction of an incoming signal wave, which consists in varying the amplitude of said incoming wave at a predetermined frequency to produce an envelope wave of a different frequency from that of the incoming wave, rectifying the varied amplitude incoming wave to derive the envelope wave, correcting the form of the envelope wave to conform to a true sine wave, generating simultaneously with the variation of the amplitude of the incoming wave a local alternating current having the same frequency as the envelope wave, combining the envelope wave with the locally generated current, and indicating the phase relation between said envelope wave and said local current.

6. A method of indicating the direction of an incoming signal wave, which consists in varying the amplitude of said incoming wave at a predetermined frequency to produce an envelope wave of a different frequency from that of the incoming wave, amplifying the varied amplitude incoming wave and then rectifying it to derive the envelope wave, correcting the form of the envelope wave to conform to a true sine wave, generating simultaneously with the variation of the amplitude of the incoming wave a local alternating current having the same frequency as the sine wave, combining the sine wave with the locally generated current, and indicating in terms of direction the phase relation between said sine wave and said local current.

7. A method of indicating the direction of an incoming signal wave, which consists in varying the amplitude of said incoming wave at a predetermined frequency to produce an envelope wave of a different frequency from the incoming wave, amplifying the varied amplitude incoming wave and then rectifying it to derive the envelope wave, correcting the form of the envelope wave to conform to a true sine wave, amplifying said envelope wave, generating simultaneously with the variation of the amplitude of the incoming wave a local alternating current having the same frequency as the amplified sine wave, adjusting the phase of said local current with respect to a predetermined reference plane, combining the sine wave with the locally generated current, and indicating the phase relation between said sine wave and the said local current.

8. In a radio direction finding system, the combination of a rotatable loop adapted to receive radio frequency currents, means for rotating said loop at a predetermined speed to vary the amplitude of said radio frequency currents thereby producing an envelope wave the frequency of which is determined by the speed of rotation of said loop, means for rectifying said varied-amplitude radio frequency currents to obtain the envelope wave, means for generating a local alternating current of the same frequency as the envelope wave and having a definite phase relation with respect to a predetermined reference plane, said phase relation being varied in accordance with the variation in direction of the incoming radio frequency currents, means for adjusting the phase relation with respect to said reference plane, and means for indicating said phase relation so that the direction of the incoming radio frequency currents may be determined.

9. In a radio direction finding system, the combination of means for collecting radio frequency currents, means for rotating said collecting means to vary the amplitude of said radio frequency currents, means for deriving an alternating current wave from said radio frequency currents, the frequency of said derived wave having a definite relation to the speed of rotation of said collecting means, means for generating a local alternating current wave of the same frequency as the derived wave and having a definite phase relation with respect to a predetermined reference plane, said phase relation being varied in accordance with the variation in direction of the incoming radio frequency currents, means for adjusting the phase relation with respect to said reference plane, and means for indicating said phase relation so that the direction of the incoming radio frequency currents may be determined.

10. In a radio direction finding system, the combination of means for varying the amplitude of incoming received radio frequency currents, means for deriving an alternating current wave from said radio frequency currents, the frequency of said derived wave having a definite relation to the frequency of the amplitude variation of the radio frequency currents, means for correcting the form of said derived wave to conform to a true sine wave, means for generating a local alternating current sine wave of the same frequency as the derived wave, and means for indicating the phase relation between the two waves.

11. In a radio direction finding system, the combination of means for varying the amplitude of incoming received radio frequency currents, means for deriving an alternating current wave from said radio frequency currents, the frequency of said derived wave having a definite relation to the frequency of the amplitude variation of the radio frequency currents, means for generating a local alternating current wave of the same frequency as the derived wave, means for adjusting the phase of the locally generated wave, and means for indicating the phase relation between the two waves.

12. In a radio frequency system, the combination of means for varying the amplitude of incoming received radio frequency currents, means for deriving an alternating current wave from said radio frequency currents, the frequency of said derived wave having a definite relation to the frequency of the amplitude variation of the radio frequency currents, means for correcting the form of the derived wave to conform to a true sine wave, means for generating a local alternating current sine wave of the same frequency as the derived wave, means for adjusting the phase of the locally generated wave with respect to the derived wave, and means for indicating the phase relation between the two waves.

In testimony whereof I have signed my name to this specification.

ARTHUR WHITTEN BROWN.